March 9, 1948.  M. WATTER ET AL  2,437,574
AIRCRAFT
Filed May 13, 1944    15 Sheets-Sheet 1

INVENTORS
Michael Watter
Ernest G. Bruce
BY John P. Tarbox
ATTORNEY

FIG.3

March 9, 1948.  M. WATTER ET AL  2,437,574
AIRCRAFT
Filed May 13, 1944  15 Sheets-Sheet 3

FIG. 4.

INVENTORS.
Michael Watter
Ernest G. Bruce
BY John P. Tarbox
ATTORNEY

March 9, 1948.  M. WATTER ET AL  2,437,574
AIRCRAFT
Filed May 13, 1944    15 Sheets-Sheet 9

INVENTORS
Michael Watter
Ernest G. Bruce
BY John P. Tarbox
ATTORNEY

March 9, 1948. M. WATTER ET AL 2,437,574
AIRCRAFT
Filed May 13, 1944 15 Sheets-Sheet 10

INVENTORS
Michael Watter
Ernest G. Bruce
BY John P. Tarbox
ATTORNEY

INVENTORS.
Michael Watter
Ernest G. Bruce

BY John P. Tarbox
ATTORNEY

March 9, 1948.  M. WATTER ET AL  2,437,574
AIRCRAFT
Filed May 13, 1944  15 Sheets-Sheet 15

FIG. 29

INVENTORS
Michael Watter
Ernest G. Bruce
BY John P. Tarbox
ATTORNEY

Patented Mar. 9, 1948

2,437,574

UNITED STATES PATENT OFFICE 2,437,574

AIRCRAFT

Michael Watter and Ernest G. Bruce, Philadelphia, Pa., assignors to The Budd Company, Philadelphia, Pa., a corporation of Pennsylvania Application May 13, 1944, Serial No. 535,462

14 Claims. (Cl. 244—117)

1

This invention relates to aircraft, particularly to landing gear anchorages, and has for an object the provision of improvements in this art.

The landing gear with which the present invention is concerned is mounted on the wings of a twin-engine airplane outboard of the fuselage and in line with the engines and nacelles. Normally the landing gear of twin-engined airplanes is mounted on the framework of the wings. In the present airplane it is desired to load and unload through an opening beneath the rear part of the fuselage, hence considerable height is desired between the bottom of the fuselage and the ground. In order to provide this height the wing landing gear is anchored to the bottom of the nacelle and retracts into the nacelle. This arrangement places unusual loads in the nacelle and it is an object of the present invention to provide structural means in the nacelle and wings suitable for taking these loads. Moreover, the nacelle is built and arranged to take heavy loads both from the engine mount and landing gear, in effect, forming a rib-like stressed skin blanket and frame extension of the spar-rib frame of the wing.

The wing is provided with a main spar located adjacent the rear of its load-carrying section and with a stub spar located near the front of the wing, which front spar extends from the fuselage outward across the nacelle. Very strong rigid ribs tie the spars together on each side of the nacelle and extend rearward into the trailing portion of the wing to support the rear end of the nacelle.

The nacelle is provided with a strong bulkhead or firewall secured beneath the front spar which, together with the spar, serves as an anchorage for the engine mount, the side walls of the nacelle being made strong so as to carry loads from the bottom of the firewall back into the rear spar and serving in conjunction with the shear ribs of the wings to form a very deep rigid box-like structure.

Beneath the rear spar the nacelle is provided with another rigid bulkhead, to the lower edge of which the main thrust strut of the main landing gear is anchored.

Behind the main spar still another bulkhead is secured in the nacelle and to this the brace or drag strut of the main landing gear is anchored. Between the second and third bulkheads the nacelle comprises longitudinal structure which is especially designed to carry the loads which may be imposed by the landing gear. This must provide not only for normal landings but also for

2 non-level or side slip landings, high tail landings, and what is perhaps the worst condition, a high nose landing.

The above and other objects and advantages of the invention will be apparent from the following description of an exemplary embodiment thereof, reference being made to the accompanying drawings, wherein:

Figure 1:
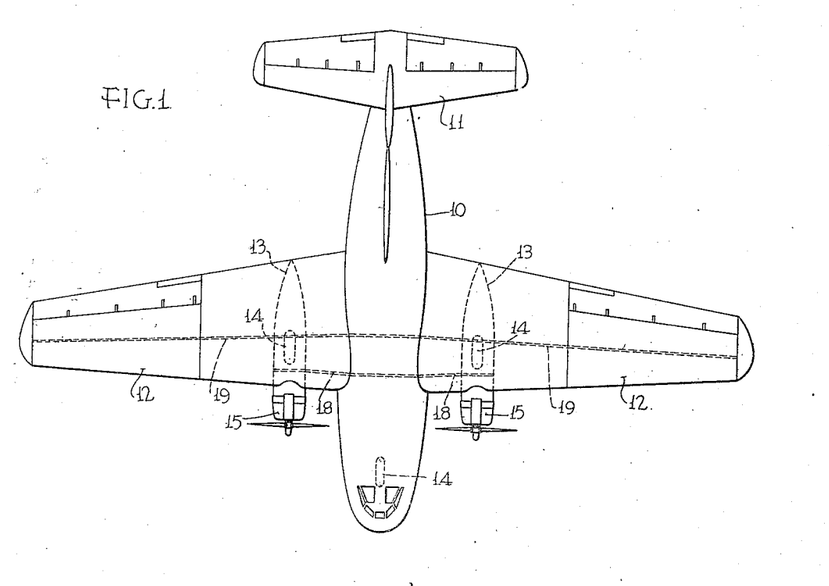
Fig. 1 is a plan view of a twin-engine airplane embodying the invention.
Figure 2:
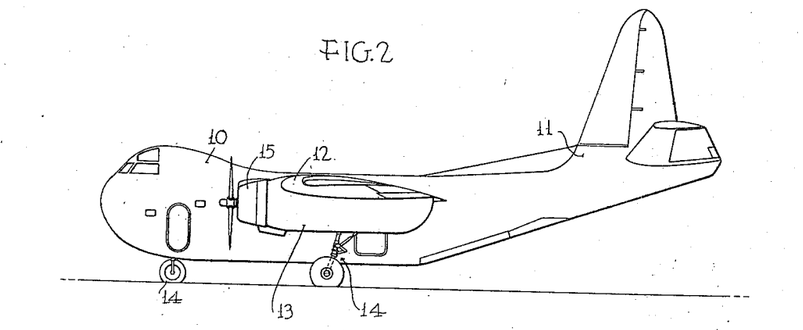
Fig. 2 is a corresponding side elevation.
Figure 3:
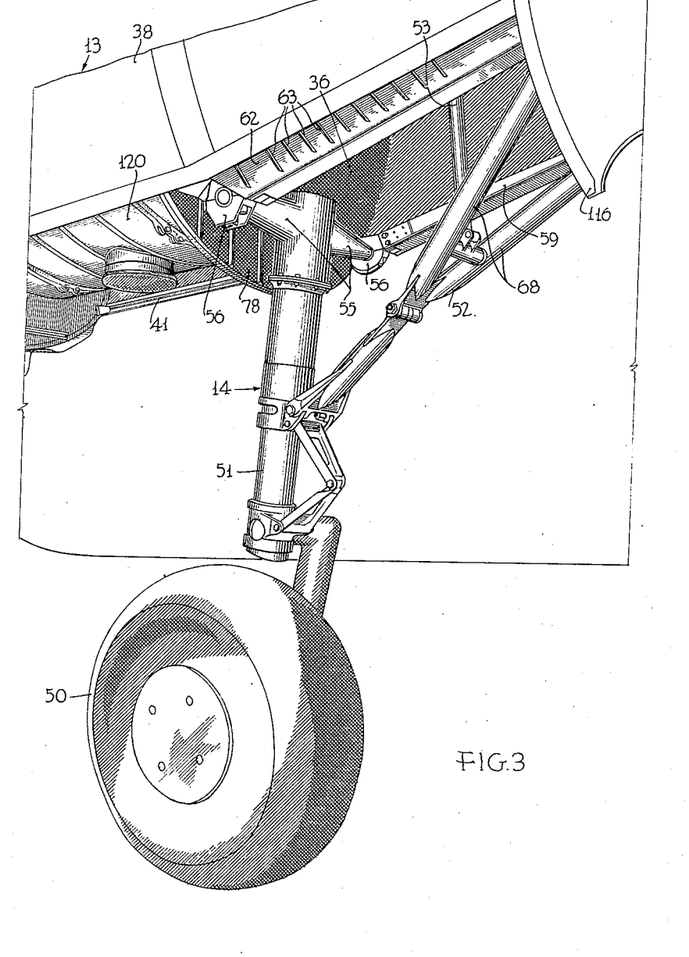
Fig. 3 is a lower side and rear perspective view of the landing gear and its anchorages.
Figure 4:
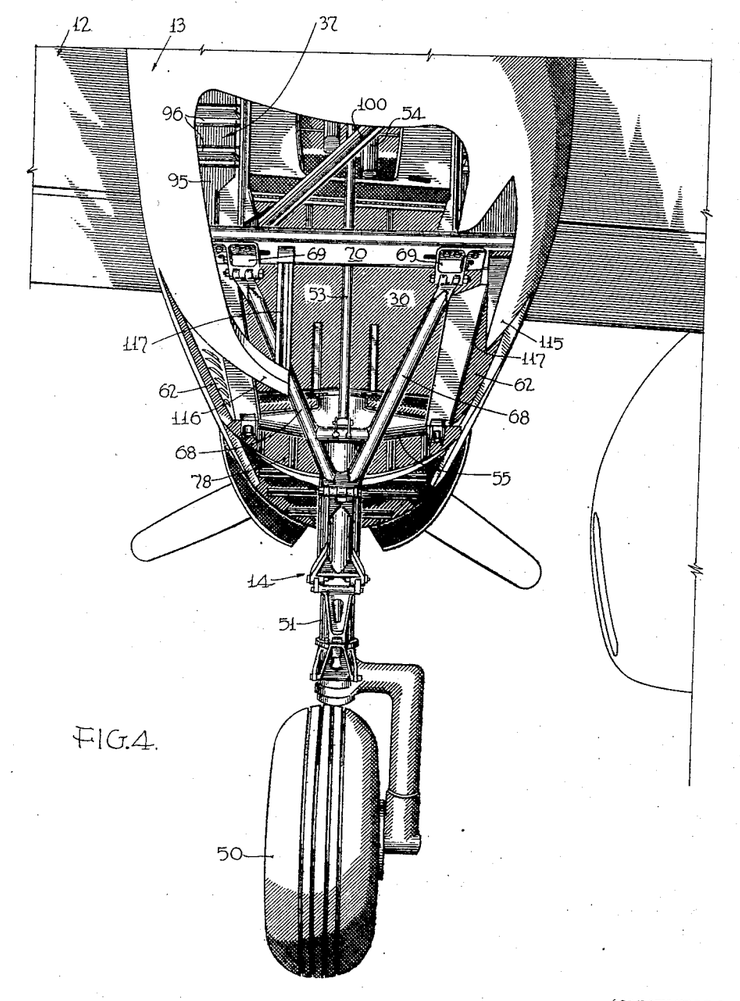
Fig. 4 is a lower rear perspective view of the same.
Figure 5:
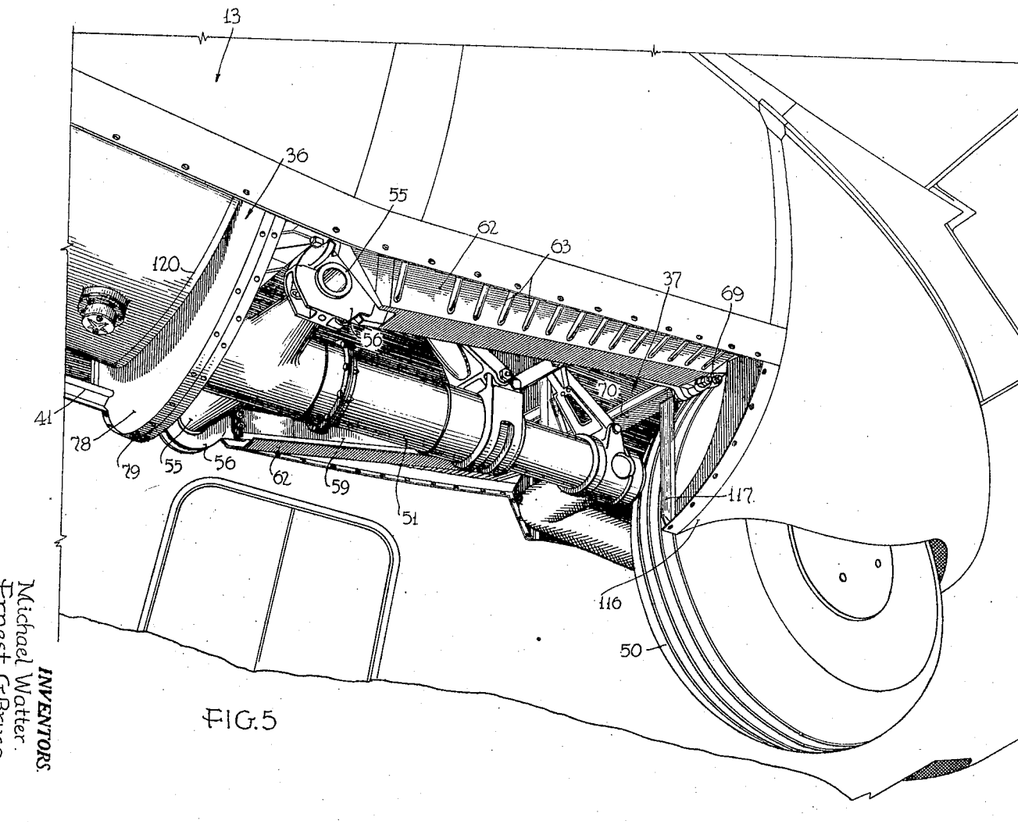
Fig. 5 is a side perspective view showing the landing gear in retracted position.
Figure 6:
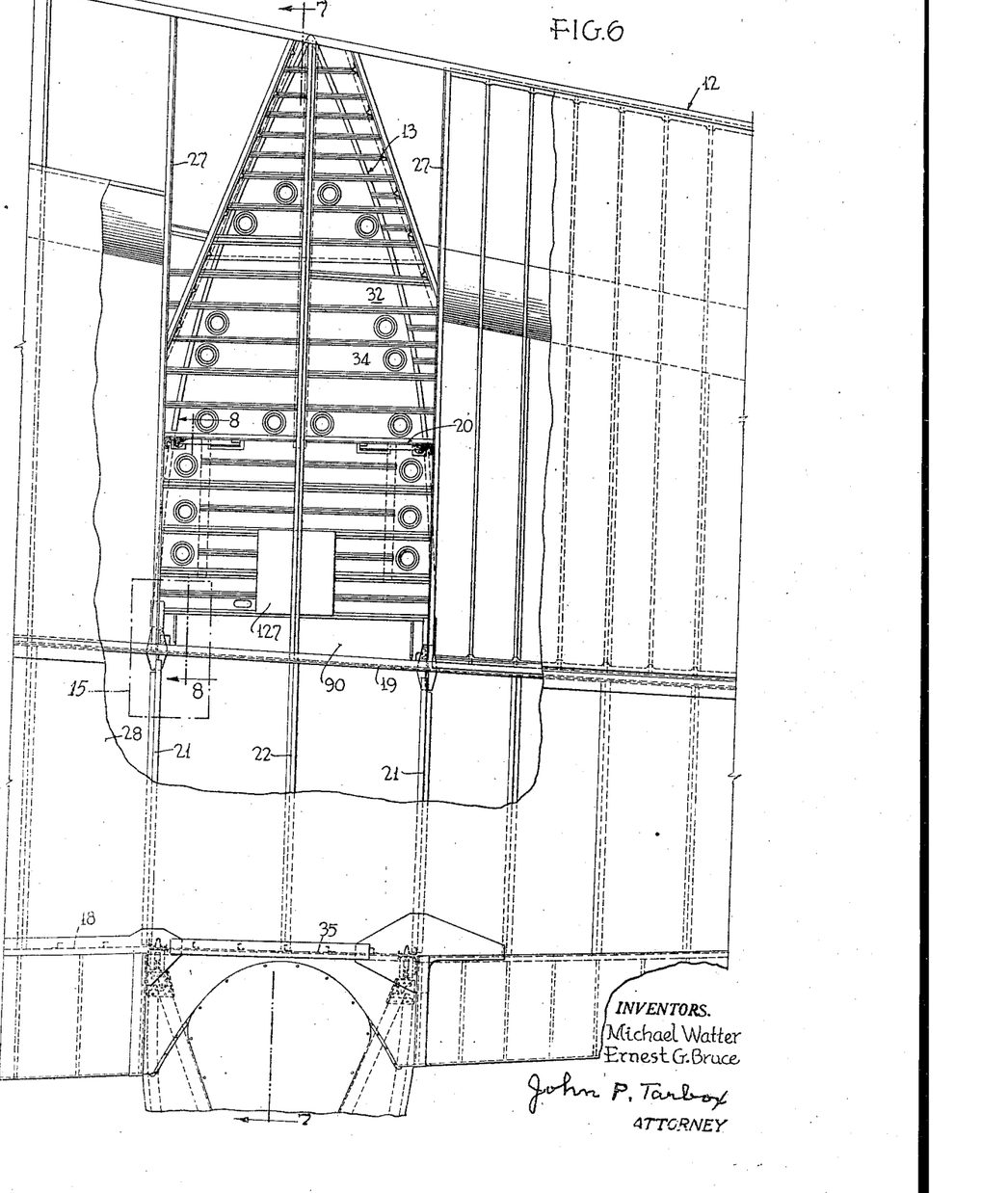
Fig. 6 is an enlarged plan view with a portion of the upper skin blanket cut away.
Figures 6, 8:
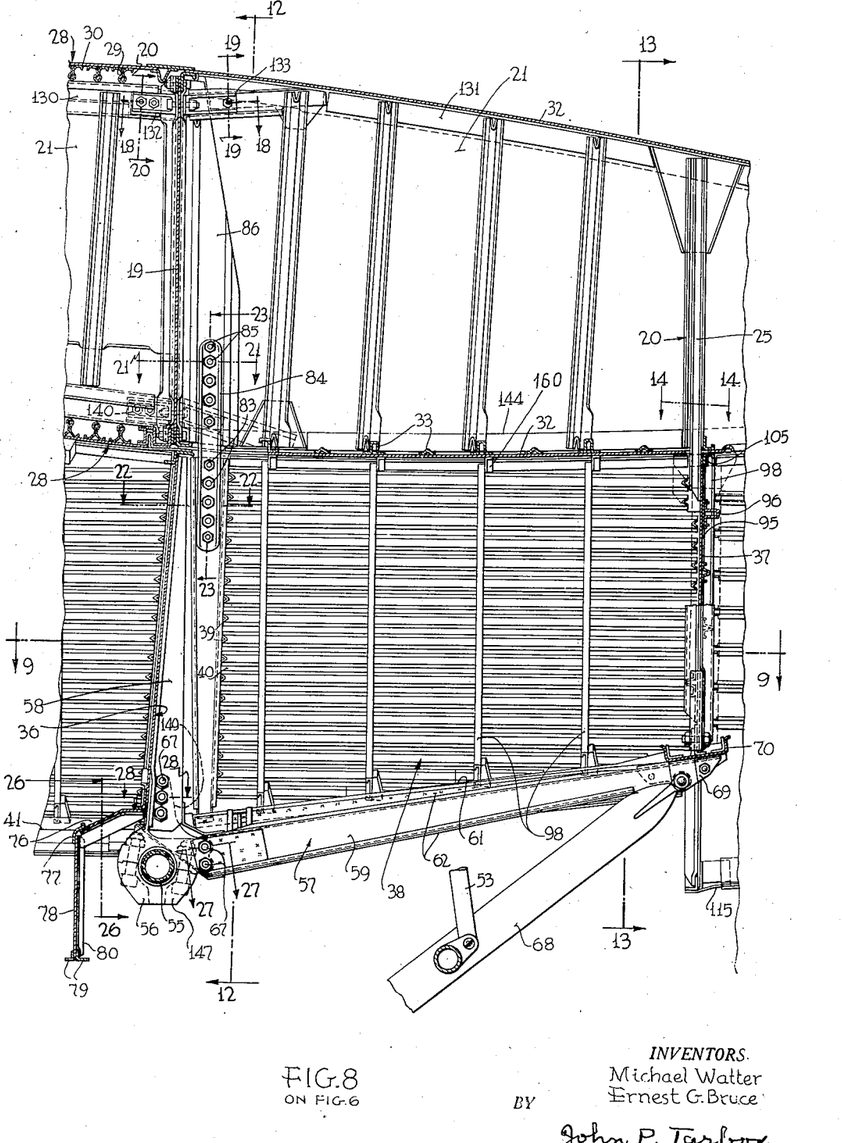
Fig. 8 is a further enlarged partial vertical section taken on the line 8—8 of Fig. 6.
Figures 6, 15:
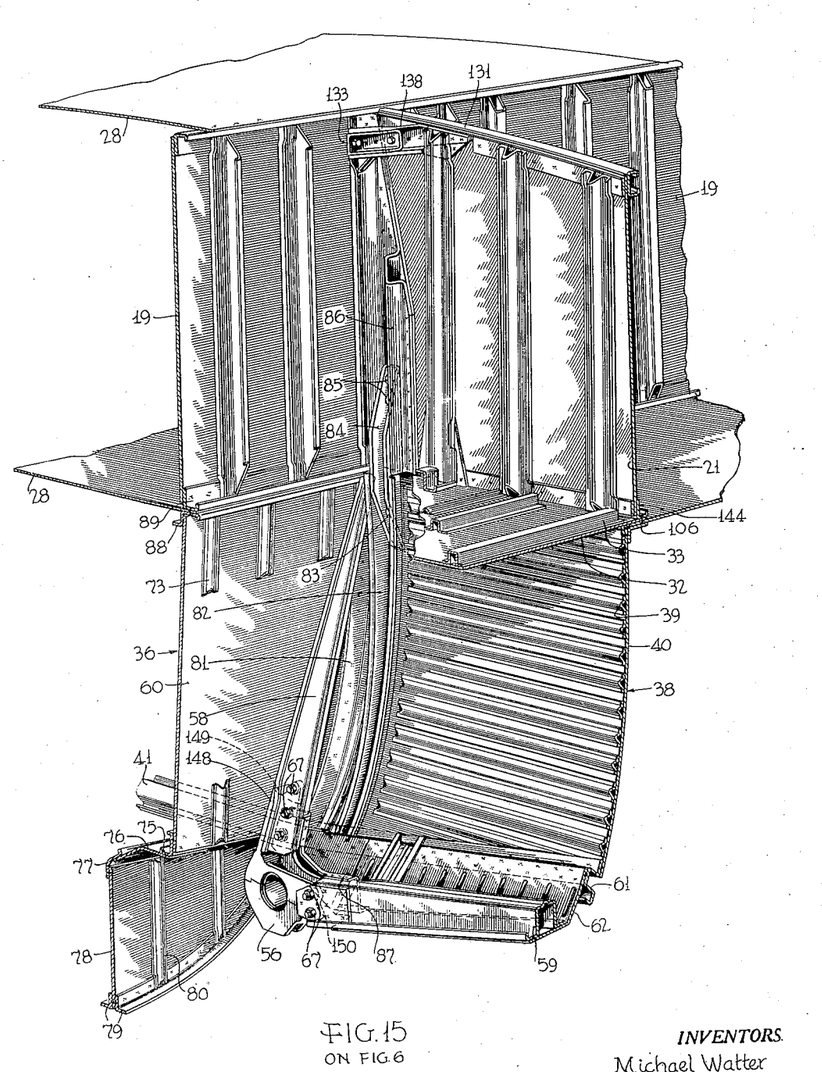
Fig. 15 is an enlarged vertical sectional perspective view taken in the zone 15 of Fig. 6.
Figure 7:
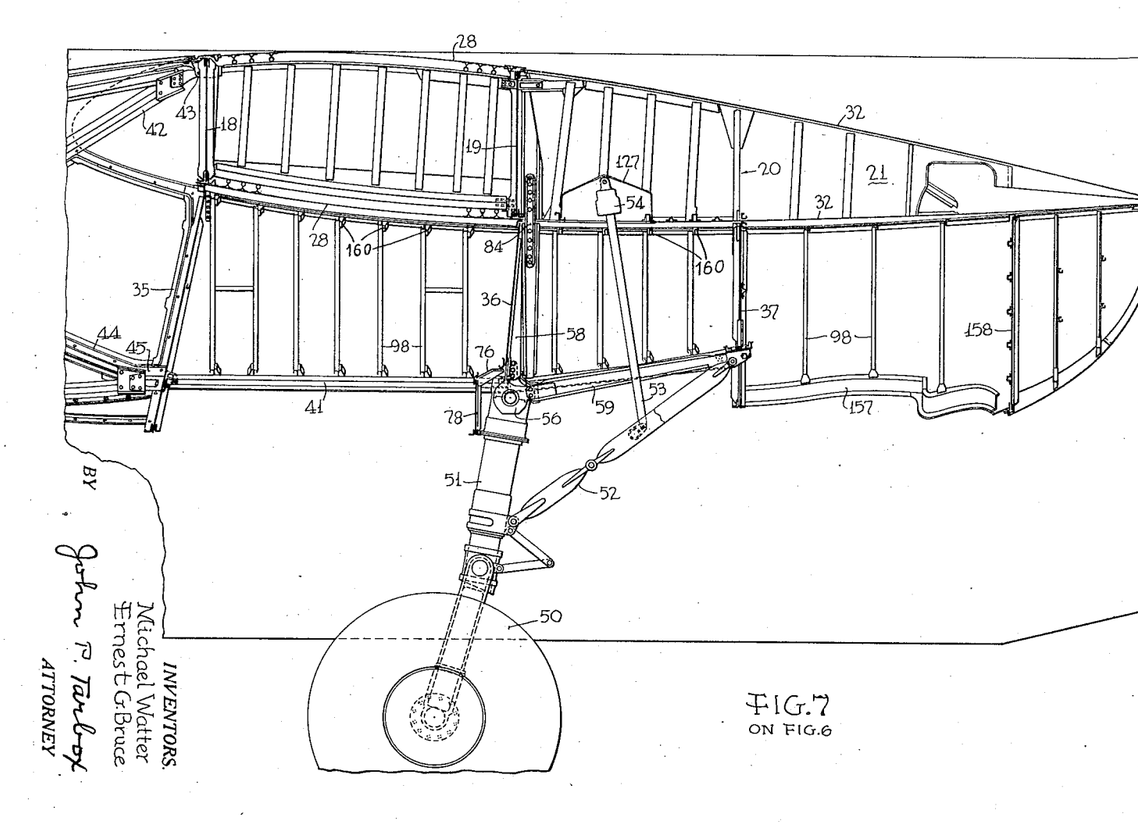
Fig. 7 is a longitudinal vertical section taken on the line 7—7 of Fig. 6.
Figures 8, 18, 19, 20, 21, 22, 23:
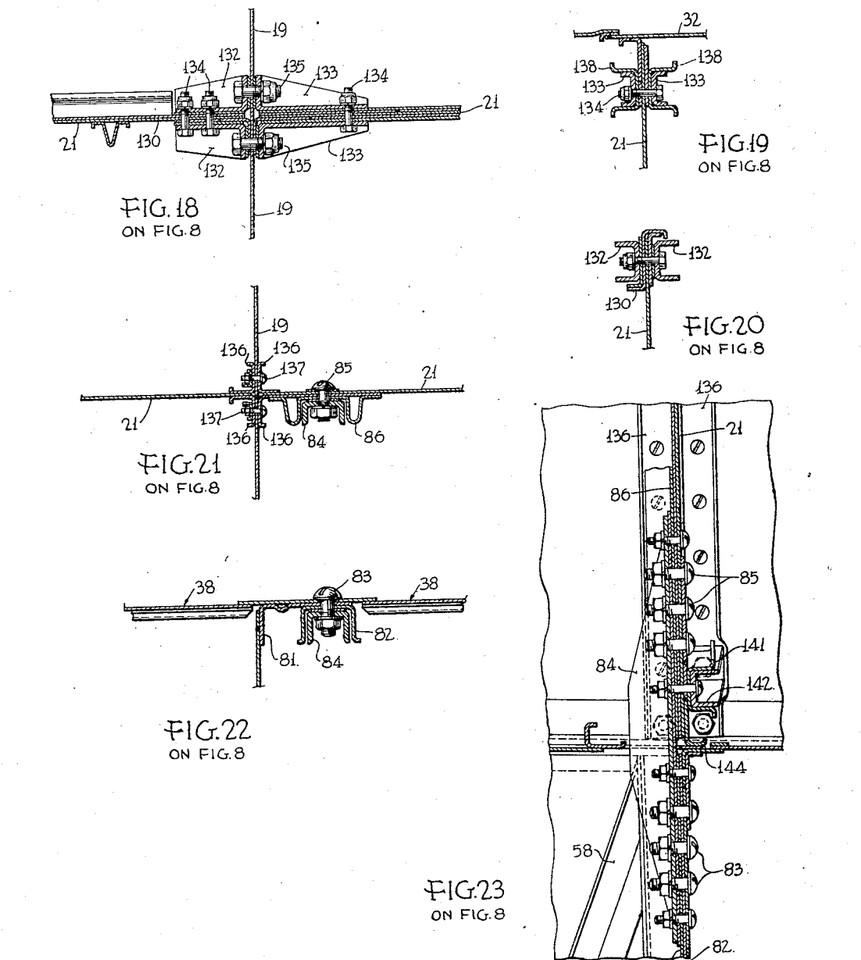
Fig. 18 is an enlarged horizontal section taken on the line 18—18 of Fig. 8.
Fig. 19 is an enlarged vertical section taken on the line 19—19 of Fig. 8.
Fig. 20 is an enlarged vertical section taken on the line 20—20 of Fig. 8.
Fig. 21 is an enlarged horizontal section taken on the line 21—21 of Fig. 8.
Fig. 22 is an enlarged horizontal section taken on the line 22—22 of Fig. 8.
Fig. 23 is an enlarged vertical section taken on the line 23—23 of Fig. 8.
Figures 8, 24, 25, 26, 27, 28:
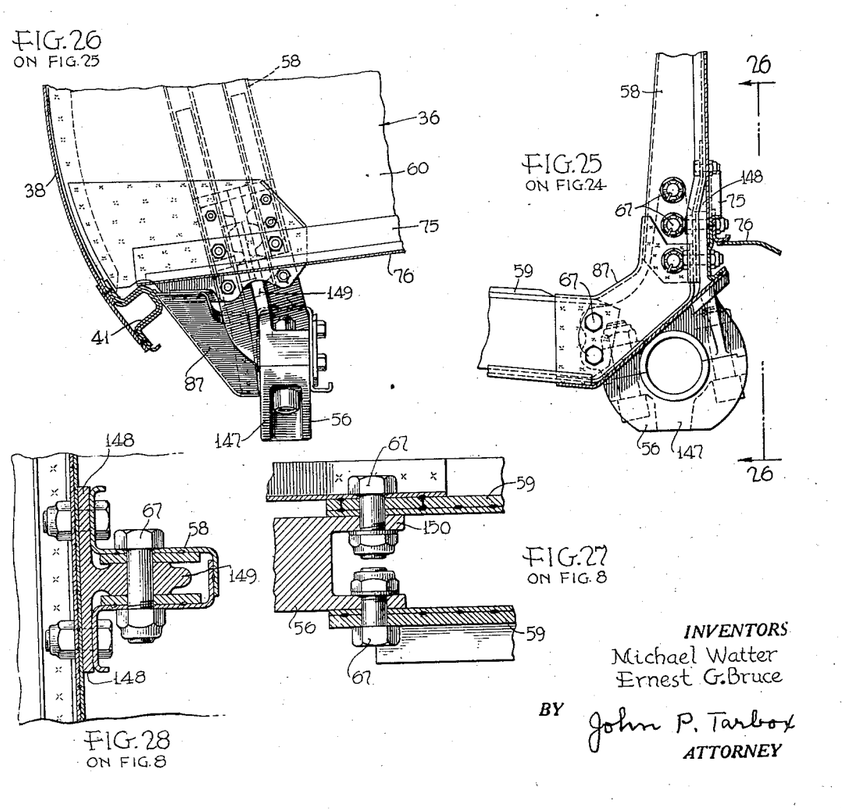
Fig. 24 is an enlarged bottom plan view taken in the zone 24 of Fig. 9.
Fig. 25 is a vertical section taken on the line 25—25 of Fig. 24.
Fig. 26 is an enlarged vertical section taken on the line 26—26 of Fig. 25.
Fig. 27 is an enlarged horizontal section taken on the line 27—27 of Fig. 8.
Fig. 28 is an enlarged horizontal section taken on the line 28—28 of Fig. 8.
Figure 9:
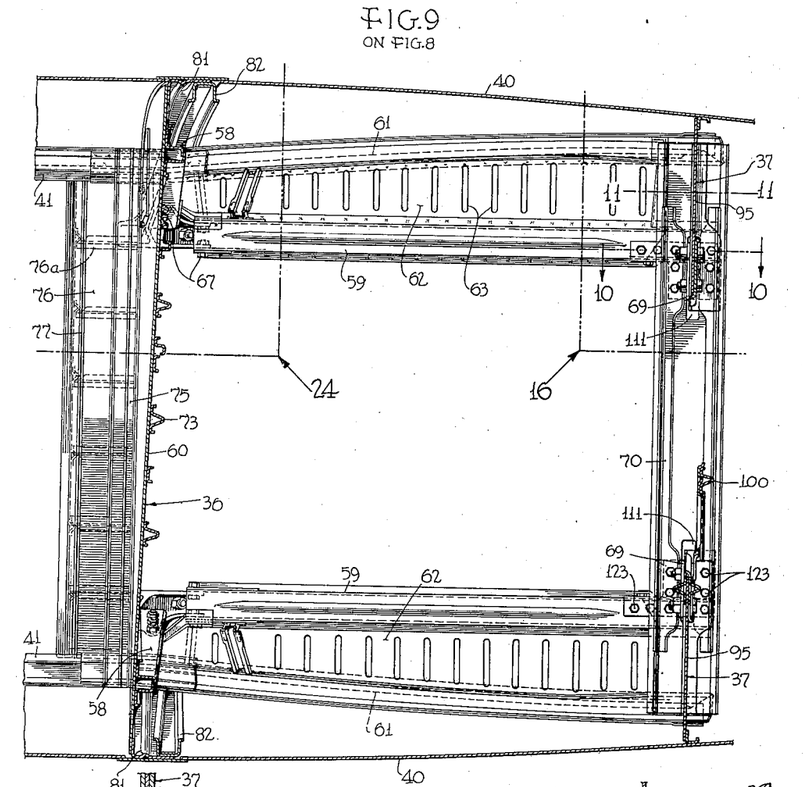
Fig. 9 is a horizontal section taken on the line 9—9 of Fig. 8.
Figures 9, 16, 17:
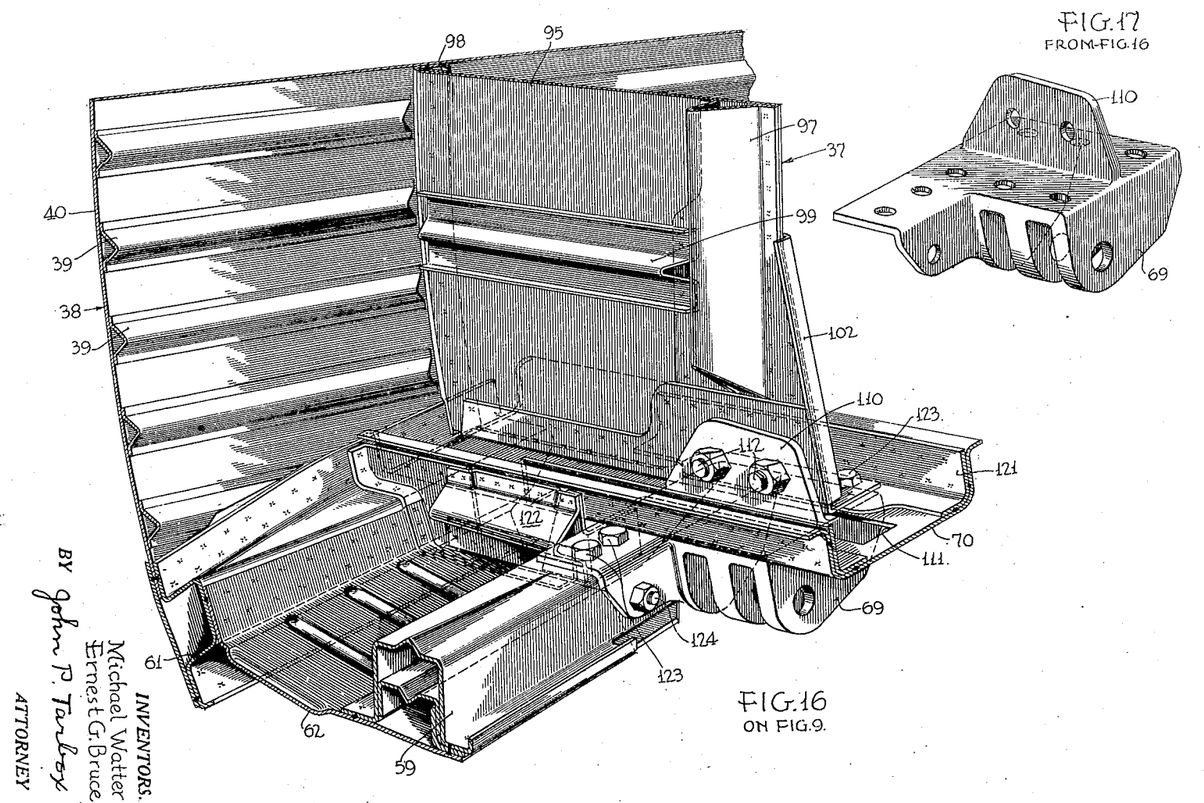
Fig. 16 is an enlarged vertical perspective view taken in the zone 16 of Fig. 9.
Fig. 17 is a perspective view of a forging shown in Fig. 16.
Figures 9, 24:
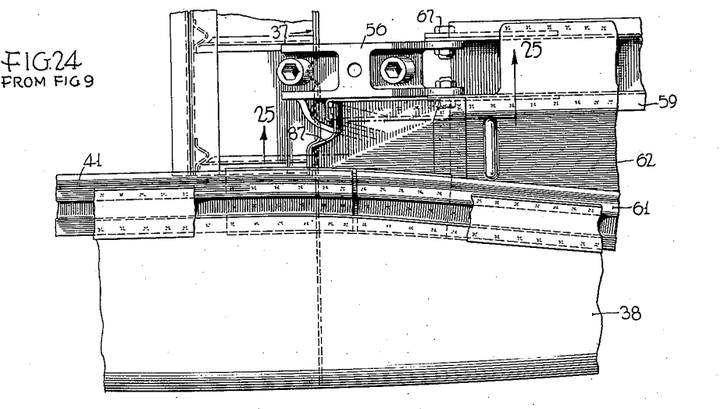
Figures 10, 11:
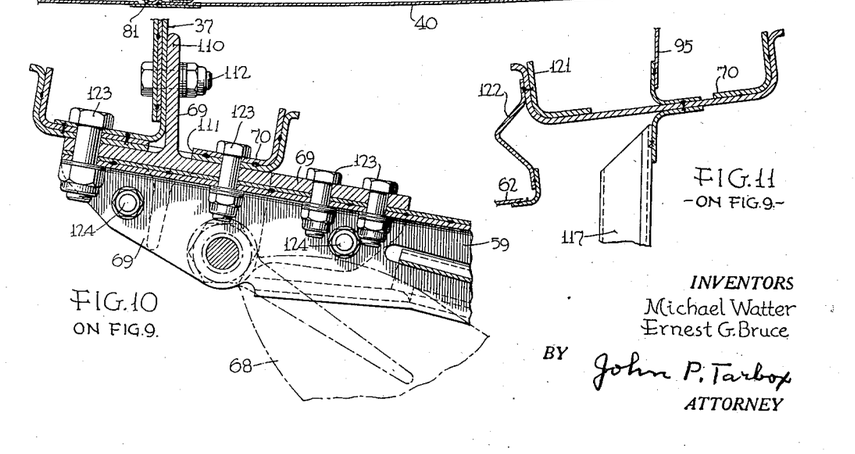
Fig. 10 is an enlarged vertical section taken on the line 10—10 of Fig. 9.
Fig. 11 is an enlarged vertical section taken on the line 11—11 of Fig. 9.
Figure 12:
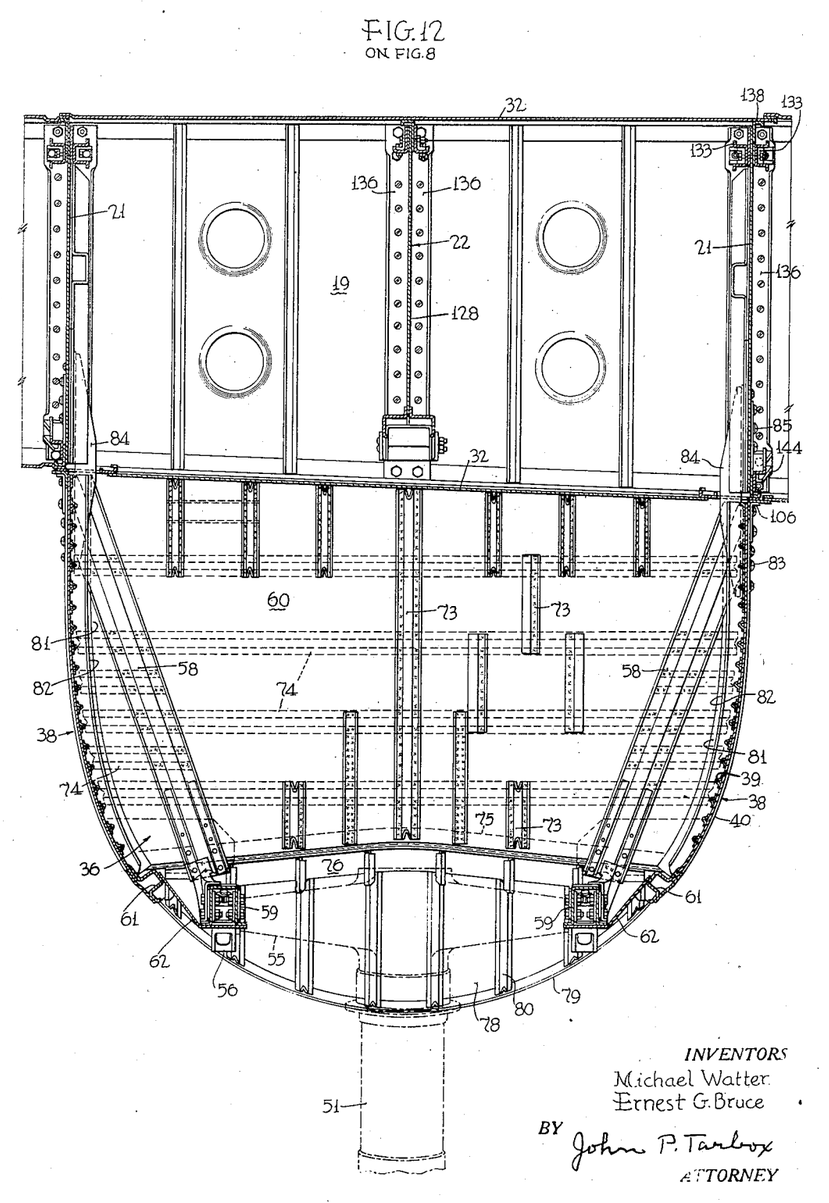
Fig. 12 is a vertical transverse section taken on the line 12—12 of Fig. 8.
Figure 13:
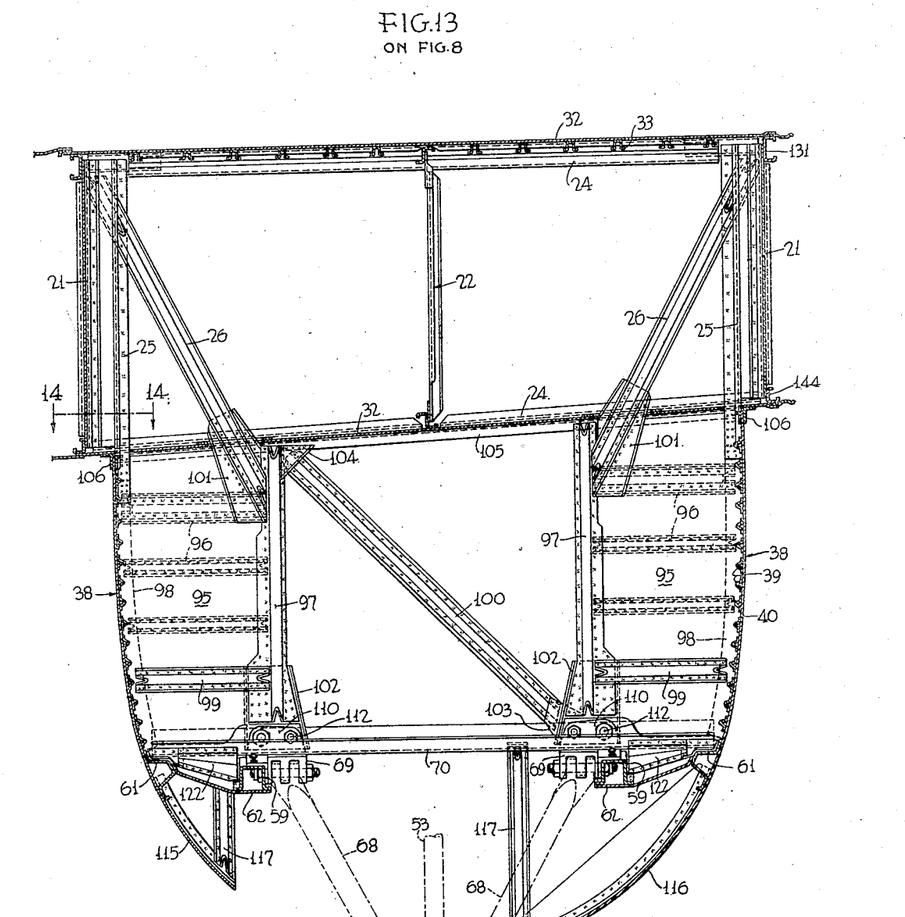
Fig. 13 is a vertical transverse section taken on the line 13—13 of Fig. 8.
Figure 14:
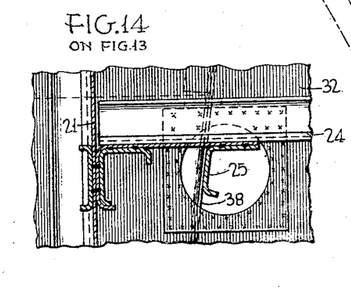
Fig. 14 is an enlarged horizontal section taken on the line 14—14 of Fig. 13.
Figure 29:
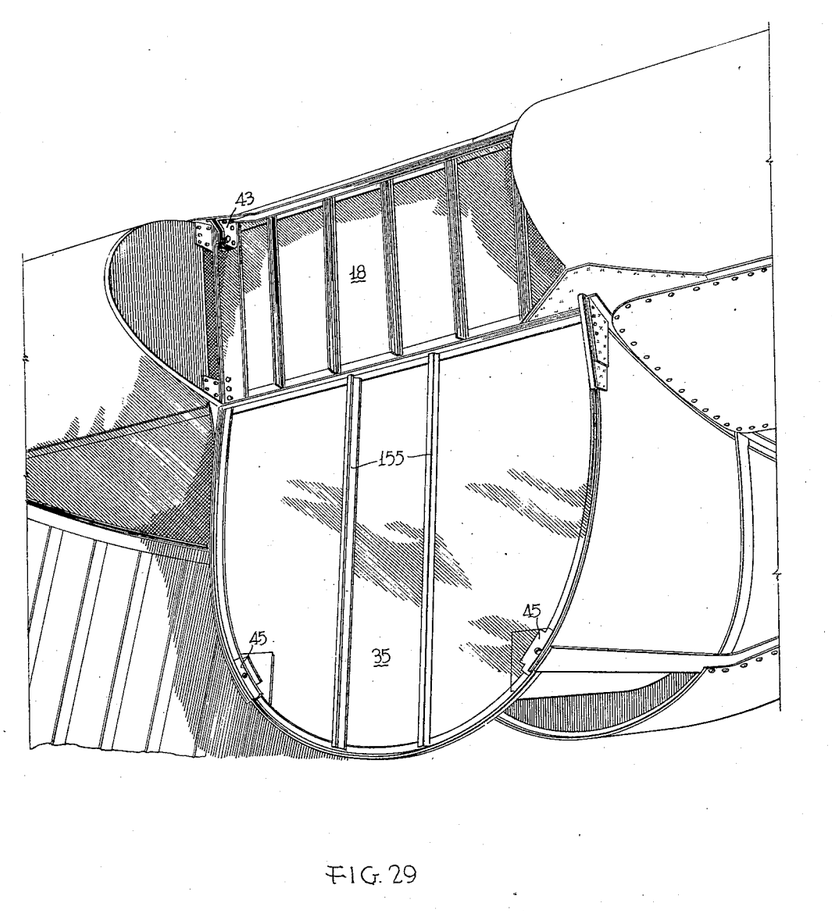
Fig. 29 is a front perspective view of the front spar and firewall bulkhead.

Referring to the drawings, the airplane comprises a fuselage or body 10, tail 11, and wings 12. On each wing outboard of the fuselage there is secured a depending nacelle 13 upon which is mounted a landing gear 14, and an engine 15. The wing includes a front or fore spar 18, a rear or main spar 19, an aft false spar 20, and shear ribs 21.

The front spar may terminate at the outer side of the nacelle and therebeyond the leading edge or nose portion of the wing may be formed as a hollow fore spar. Aside from the loads to be carried between the nacelle region and the body, another important reason for using a distinct front spar instead of a hollow nose spar inboard of the nacelle is to leave the space in front of the spar region open for the installation of piping, wiring, cables, and the like. With this construction it is only necessary to provide a removable leading edge or nose enclosure to act as an airfoil.

The shear ribs 21 are divided fore and aft at the rear spar and aft thereof in the trailing section the inner branches converge toward each other. The false spar 20 is of open construction comprising chords 24, vertical struts 25 and inclined struts 26. In the region of the false spar each shear rib 21 is provided with an outer branch 27 which extends straight toward the rear to support the covering and the flap bearings.

The main or principal load-bearing section of the wing between the front and rear spars is covered, top and bottom, by a load-carrying skin blanket 28 formed of stringers 29 and a stressed metal skin sheet 30. The trailing section of the wing aft of the rear spar and between the shear ribs 21 is covered, top and bottom by a metal shear panel covering 32. The bottom covering aft of the rear spar is provided with reinforcing stringers 33 and lightening and access openings 34. Outside the nacelle region, except on the inboard side, the trailing section of the wing is covered with fabric.

The nacelle includes a front bulkhead or firewall 35 secured beneath the front spar, a rear bulkhead 36 secured beneath the rear spar, a trailing section bulkhead 37 secured beneath the false spar 20, and stressed skin side walls 38. The side walls include skin blankets formed of stringers 39 and skin sheets 40, and stiff strong lower longerons 41 between the front and rear bulkheads.

The engine is supported in cantilever fashion by upper struts 42 attached to brackets 43 near the upper part of the front spar and lower struts 44 attached to brackets or compression plate supports 45 near the lower part of the front nacelle bulkhead at the forward ends of the nacelle longerons 41. The bulkhead 35 is inclined forwardly from the lower edge of the front spar the better to transmit to the spar rearwardly directed loads from the engine and from the landing gear, the loads from the engine passing back as compression or thrust through the lower mounting struts and the loads from the landing gear passing forward as tension through the stiff longerons 41.

The landing gear comprises a wheel 50, a thrust or oleo strut 51 anchored to the lower edge of the rear bulkhead 36 and a drag strut 52 anchored to the lower edge of the trailing bulkhead 37. The drag strut is hinged intermediate its length and is operated by an extensible strut 53 anchored to an intermediate trailing wing rib 22 aft of the rear spar 19 and forward of the false spar 20. The operating strut 53 may include a screw jack element actuated by a motor 54.

The thrust strut 51 at its mounting on the rear bulkhead comprises trunnion arms 55 mounted in trunnion bearings 56 provided at the elbow of strong rigid L-shaped brackets 57. One arm 58 of a bracket extends upwardly along the bulkhead and the other 59 extends rearwardly to a connection with the lower edge of the trailing bulkhead. The vertical arms 58 are inclined outwardly toward the top and at the upper edge of the nacelle their ends are disposed adjacent the nacelle side walls. This angular disposition, together with the frame and shear web 60 of the bulkhead provides strong resistance to side thrusts on the landing gear.

The horizontal arms 59 of the brackets extend along the lower edge of the nacelle sides inwardly of the longeron extensions 61. Stiff strong shear panels 62 connect the arms 59 and the longeron extensions 61, the panels being stiffened transversely at intervals, as by pressed corrugations 63. The horizontal arms 59 may be made integral with the vertical arms 58 or, as shown, may be made separately and secured thereto through the bearing forgings 56, as by bolts 67. The vertical arms 58 may in like manner be connected to the lower arms through the forgings 56, as by bolts 67.

The drag strut 52 aft of its hinge is divided laterally and the furcations 68 are hinged to brackets 69 which are secured to the lower edge of the trailing bulkhead 37 adjacent the nacelle side walls, where the horizontal arms 59 are connected.

The horizontal arms 59 of the L-shaped brackets 57 are inclined upwardly toward the rear end. The longeron extensions 61 are also inclined upwardly toward the rear to a point of attachment to the wide rigid bottom frame element 70 of the trailing bulkhead 37. The upward inclination of the arms 59 places their rear ends nearer the center of the nacelle where it is wider, hence the net result is that the arms 59 are also inclined outwardly in spite of the fact that the nacelle tapers toward the rear end. For this reason, and for the further reason that the nacelle is made in several sections, the longerons 41 and the longeron extensions 61 are jointed at an angle at the rear bulkhead 36.

The rear bulkhead 36 is strengthened on the rear side by a plurality of vertical stiffeners or struts 73. On the front side it is strengthened by a plurality of horizontal stiffeners 74. The horizontal stiffeners are increased in number between the outwardly inclined vertical arms 58 and the sides of the nacelle.

Near the bottom at the longeron level a horizontal frame element 75 is provided and to it a forwardly extending thick plate 76 is secured. This gives great strength and rigidity with small weight. To the plate 76, which is bent downwardly, there is secured by a splicer strip 77 a bottom wall extension 78. The wall extension 78 adds strength and also serves to secure a bottom cover (not shown) for the forward tank region of the nacelle. The plate 76 is reinforced by stiffeners 76a. The sheet web of the wall extension is bordered by curved bottom reinforcement 79 and the web is strengthened by vertical stiffeners 80. By this construction the web 78 is offset forwardly to clear the strut trunnions and bearings.

To the side edges of the bulkhead 36 there are secured thick rigid curved border members 81 which follow the shape of the nacelle sides. To the rear of the border members 81, curved channels 82 are secured to the sides of the nacelle and at their upper ends these channels are secured, as by bolts 83, to the protruding ends of strong splice plates 84, which splice plates at their upper ends are secured, as by bolts 85, to heavy vertical reinforcements 86 secured to the rear spar 19 and the ribs 21. The channels 82 are secured over a wing of the border members 81. Compound gussets 87 tie the arms 58, 59, horizontal shear panels 62, and related parts together.

It is to be noted that the rear bulkhead 36 to which the thrust struts of the landing gear are secured is twisted between its upper and lower edges. The upper edge is aligned with the rear spar, which at this point is not perpendicular to the central plane of the nacelle, whereas the lower edge is perpendicular to the central plane of the nacelle. This aligns the wheel to run parallel with the longitudinal axis of the airplane. This twisting incidentally greatly rigidifies the bulkhead.

The upper edge of the bulkhead is strengthened by a cap strip 88 which is secured to the bottom chord 89 of the spar, an opening 90 which is later closed by a plate being provided to permit access for this and other purposes.

The trailing bulkhead 37 includes, besides the horizontal bottom frame element 70, shear panels 95 on each side strengthened by horizontal stiffeners 96 on the rear side, vertical struts 97 on the inner front edges, and curved rib struts 98 on the outer rear edges. There are similar rib struts 98 at spaced intervals along both side walls of the nacelle. Near the bottom there are horizontal stiffeners 99 on the front of the panels 95. The interior open space of the bulkhead is braced by a diagonal strut 100.

The outer vertical struts 25 of the false spar 20 are extended below the bottom surface of the wing and are connected to the rib struts 98. The inclined struts 26 of the false spar are also extended below the bottom surface of the wing and are provided with spreader plates 101 which along with the strut extensions are secured to the panels and struts of the bulkhead.

Reinforcing plates 102 are secured to the lower inned corners of the shear panels 95 and the lower ends of the struts 97. A gusset plate 103 is interposed between the lower end of the diagonal strut 100 and one of the plates 102. A gusset plate 104 secures the upper end of the diagonal 100 to the upper end of the other strut 97 and to the cap strip 105 of the bulkhead.

All along their length the sides of the nacelle skin sheets 40 are secured to the lower wing covering sheets by angle fairing strips 106.

Besides being secured to the bottom frame element 70 upon a side wing of a bracket 69, each horizontal arm 59 is secured, as by bolts, to the side of the bracket. The bracket, above the flat seat which rests against the bottom of the frame element 70, is provided with a projection 110 which extends through an opening 111 in the frame element and thereabove is secured, as by bolts 112 to the reinforcing plate 102.

Aft of the trailing bulkhead 37, curved side wall extensions 115, 116 are attached to the bottoms of the side walls. They are contoured at their lower edges to fit the landing gear when retracted. The wheel 50 is about half enclosed in the retracted position. Behind the wheel position the extensions unite in one piece which continues to the rear end of the nacelle. The front ends of one or both of the extensions below the bulkhead 37 may be held in position by bracing struts 117.

The outer portion of the space between bulkheads 36 and 37 is left open in the drawings to view the parts but after assembly a cover plate (or plates, not shown) is secured between the curved lower edge of the rear extensions 115, 116 and the curved lower edge of the extensions 78, space being left intermediate the sides to receive the strut and wheel of the landing gear. The screw anchorages for this partial cover are shown in the drawings.

The space in the nacelle forward of the rear bulkhead is adapted to house a fuel tank 120 and after assembly a curved cover (not shown) is placed over the bottom opening, the cover being anchored by screws to the curved bottom edges of the front bulkhead 35 and rear bulkhead 36, as indicated by the screw anchorages.

The side shear panel 62 at the rear end are secured to the frame element 70 and its flange edge reinforcement 121 by connection pieces 122.

The rear ends of the horizontal arms 59 are secured to the transverse frame element 70 upon a wing of the bracket forgings 69 by bolts 123. Laterally the arms are secured to the forging by bolts 124.

It will be noted that the transverse frame element 79 on the bulkhead 37 slopes downward forwardly toward the trunnion mounting on the bulkhead 36. It will also be noted that the bottom of the bulkhead 36 is bowed up in the center to receive the central junction portion of trunnions and thrust strut, this central portion being of increased diameter.

From the rear spar 19 back to an enclosure 127 for the upper pivot pin of the jack strut 53 the central wing rib 22 is formed with a full sheet web 128 for greater strength for taking the required load.

The chords 130 of the shear ribs 21 forward of the rear spar 19 are united with the chords 131 of the ribs aft of the spar by channel angle gussets 132 on each side of the rib in front of the spar and by channel angle gussets 133 on each side of the rib behind the spar, bolts 134 being used through the rib and bolts 135 through the spar. These gussets are imposed over the usual joint reinforcement 136 on each side of the spar and ribs which is united by bolts 137 through the spar. On the rear longer channels 138 extend to a point of connection to the rear rib chords 131.

On the bottom of the spar similar angle channel gussets 140 in front of the spar and channel gussets 141, 142 behind the spar unite the lower rib chords 143, 144 through the spar 19.

The bearing forging 56 is made with a removable cap portion 147. The upper portion of the forging 56 is provided with a tang 148 carrying a central rib 149 which is outwardly inclined to align with an arm 58. It is secured to the embracing side walls of the arm by the bolts 67 previously mentioned. At the rear side the forging 56 is provided with bifurcated stub plates 150 which are separately secured by the bolts 67 to the spaced side walls of the horizontal arm 59.

The firewall bulkhead 35 is rigidified by stiff spaced vertical struts 155 on the front and by horizontal stiffeners 156 on the back.

The wheel recess aft of the trailing section bulkhead 37 is reinforced by an edge strip 157. The rear end of the nacelle behind the opening is braced by a tail bulkhead 158.

The upper ends of some or all of the rib-struts 98 along the side walls of the nacelle are attached to protruding shear tabs 160 which are attached to the interior framework of the wing.

Due to the forward inclination of the thrust strut 51 in relation to its supports it transmits a thrust load which is partly passed upward through its bulkhead to the spar and partly passed backward through the arms 59. The drag strut carries a tension load to its supports on the trailing bulkhead and this load is transmitted as a compression load forward through the arms 59. The oppositely directed compression forces in the arms thus tend to balance and make the lateral strains on bulkheads the minimum. The engine thrust in part is transmitted as a compression load along the stiff sides and particularly along the bottom longerons of the nacelle. This load is transmitted upward all along the length of the nacelle into the ribs of the wing frame, and particularly is it carried up through the bulkheads into the spars at the rib junctions.

The longerons are very stiff and strong all along the nacelle. Particularly is the longeron structure strong between the rear and trailing bulkheads, being there strengthened through the tie of the shear plate by the arm 59.

While one embodiment of the invention has been described for purposes of illustration it is to be understood that there may be various embodiments within the limits of the prior art and the scope of the subjoined claims.

What is claimed is:

1. In an airplane in combination, a wing having a spar and strong rib structure secured therebehind, a nacelle provided with a first bulkhead secured beneath the spar, a second bulkhead secured below the rib structure aft of the spar, a cantilever structure secured to and extending from the bottom of the first bulkhead to the second bulkhead and there secured, and a landing gear having a forward main thrust strut and a rearward drag strut and having its main thrust strut secured to the bottom of the first and its drag strut secured to the bottom of the second bulkhead.

2. In an airplane in combination, a wing having spanwise extending fore and aft spar means, a nacelle secured beneath said spar means, landing gear having a thrust strut anchored to the bottom of the nacelle vertically below the fore spar means and a drag strut anchored to the bottom of the nacelle vertically below the aft spar means, stiff strong chordwise extending structural members connecting the bottoms of the strut anchorages to each other along the bottom of the nacelle, and stiff strong structural members connecting each strut anchorage to the spar means thereabove.

3. In an airplane in combination, a wing having fore and aft spars, a nacelle secured beneath said spars, a bulkhead structure in said nacelle secured below each of said spars, spanwise spaced structural struts extending down each bulkhead from the upper to the lower edge thereof, chordwise extending structural frame members secured between the struts of the fore and aft bulkheads, and landing gear having struts pivotally anchored to the lower ends of said structural struts.

4. In an airplane in combination, a wing having fore and aft spars, a nacelle secured beneath said spars, fore and aft bulkhead structures in said nacelle secured below said fore and aft spars respectively, spanwise spaced structural struts extending down each bulkhead from the upper to the lower edge thereof, chordwise extending structural frame members secured between the struts of the fore and aft bulkheads, and landing gear having thrust and drag struts pivotally anchored to the lower ends of said structural struts of the fore and aft bulkheads respectively, said structural struts of the fore bulkhead being divergent upwardly along the bulkheads.

5. In an airplane in combination, a wing having fore and aft spars, a nacelle secured beneath said spars, a bulkhead structure in said nacelle below each of said spars, one of said bulkhead structures including vertical frame struts, landing gear having struts anchored to the bottom of each bulkhead, one strut being anchored to the lower ends of said structural struts, and strong rigid frame members extending chordwise between the bulkheads at the anchorages.

6. In an airplane in combination with a wing having spanwise extending fore and rear spars, ribs connecting said spars, a pair of spanwise spaced shear ribs secured to and extending aft of the rear spar, a false spar secured to the shear ribs aft of the rear spar, a nacelle secured beneath the wing along the rib region, and landing gear mounted on the bottom of the nacelle, the landing gear having a thrust strut anchored to the nacelle vertically beneath the rear spar and a drag strut anchored to the nacelle vertically beneath the false spar.

7. In an airplane in combination, a front spar, a rear spar, spanwise spaced ribs secured between said spars, and shear ribs extending aft of the rear spar in alignment with the ribs between spars, a false spar secured between the shear ribs aft of the rear spar, a nacelle secured beneath the wing and having its side walls aligned with said ribs, chordwise spaced bulkheads in said nacelle disposed vertically beneath said spars, strong rigid chordwise extending frame members secured along the lower edge of the nacelle side walls between said bulkheads, and landing gear secured by its struts to the lower edges of the bulkheads beneath the rear and false spars.

8. In an airplane in combination, a wing carrying spanwise extending horizontal frame elements and vertical frame elements, and landing gear struts mounted on said frame elements by joint anchors, the joint anchors including plate portions fitting beneath and against the horizontal frame elements, and extended projections secured to the vertical frame elements, one of said anchor projections extending upward through the horizontal frame element between its plate portion and a point of attachment to the vertical frame element.

9. In an airplane in combination, a wing having a spar which at a nacelle position is inclined at a small angle from a perpendicular to the longitudinal axis of the airplane, a nacelle mounted on said wing and having its axis parallel with the longitudinal axis of the airplane, and a spanwise extending bulkhead in said nacelle adapted to support a landing gear strut at its lower edge, the upper edge of the bulkhead being aligned with the spar and the lower edge being perpendicular to the longitudinal axis of the nacelle and airplane.

10. In an airplane in combination, a wing, a nacelle mounted beneath the wing, said nacelle including spaced side walls and a transverse bulkhead, spaced landing gear anchorages on said bulkhead, a strut extending up the bulkhead at each anchorage, and a shear panel between each strut and a side wall of the nacelle.

11. In an airplane in combination, a wing having spanwise extending fore and aft spars, a nacelle secured beneath said spars, vertical frame structures in said nacelle extending from the bottoms of said spars to the bottom of said nacelle, chordwise extending frame structures extending along the bottom of the nacelle from one vertical frame structure to the other, landing gear having a main thrust strut pivotally anchored to the bottom of the forward one of said vertical frame structures and a drag strut pivotally anchored to the bottom of the aft one of said vertical frame structures, the main thrust strut in operative position being inclined forward downwardly to impose rearwardly directed compression loads on said chordwise extending frame structures, and said drag struts also being inclined forward downwardly to impose forwardly directed compression loads in said chordwise extending frame structures.

12. In an airplane in combination, a nacelle having a pair of spaced chordwise extending longerons along the side walls, a spanwise extending member secured across the nacelle between said longerons and having landing gear strut anchorages thereon disposed at a distance from and between said longerons, a second spanwise extending member secured across the nacelle between said longerons, arms secured between said anchorages and the second spanwise extending member, and shear panels connected between said longerons and said arms on each side of the nacelle.

13. In an airplane in combination, a wing having a spanwise extending spar, a nacelle mounted below the wing, said nacelle having a transverse spanwise extending member at the bottom carrying landing gear anchorages, spaced vertical stiffeners on said spar located above the sides of the nacelle, and strut members extending from said anchorages to said spar and connected thereto at its stiffeners.

14. In an airplane in combination, a wing having a spanwise extending spar and spaced chordwise extending ribs secured to the spar, a nacelle mounted below the wing and having chordwise extending sides disposed vertically below certain of said ribs, a transverse bulkhead in the nacelle located vertically below the spar, and strut members extending from the bottom of said bulkhead upward to the bottom of said spar and thence upward to the top of said spar at each nacelle side location, said strut members including a strut element extending upward diagonally in a vertical spanwise plane.

MICHAEL WATTER.
ERNEST G. BRUCE.

REFERENCES CITED

The following references are of record in the file of this patent:

UNITED STATES PATENTS

| Number | Name | Date |
|---|---|---|
| 1,705,492 | Noble | Mar. 19, 1929 |
| 1,956,313 | Capelis | Apr. 24, 1934 |
| 2,025,743 | Hathorn | Dec. 31, 1935 |
| 2,049,066 | Kindelberger et al. | July 28, 1936 |
| 2,185,235 | Swanson | Jan. 2, 1940 |
| 2,234,394 | Amiot | Mar. 11, 1941 |
| 2,263,427 | Page | Nov. 18, 1941 |
| 2,318,568 | Wintermute et al. | May 4, 1943 |
| 2,362,016 | McKinnie | Nov. 7, 1944 |
| 2,373,860 | Torresen | Apr. 17, 1945 |